United States Patent [19]

Gerson

[11] Patent Number: 5,040,127
[45] Date of Patent: Aug. 13, 1991

[54] CONTINUOUS SPEECH RECOGNITION SYSTEM

[75] Inventor: Ira A. Gerson, Hoffman Estates, Ill.

[73] Assignee: Motorola, Inc., Schaumburg, Ill.

[21] Appl. No.: 357,071

[22] PCT Filed: Jun. 2, 1986

[86] PCT No.: PCT/US86/01224

§ 371 Date: Sep. 30, 1988

§ 102(e) Date: Sep. 30, 1988

[87] PCT Pub. No.: WO87/07749

PCT Pub. Date: Dec. 17, 1987

[51] Int. Cl.$^5$ .............................................. G10L 5/00
[52] U.S. Cl. ..................................... 364/513.5; 381/43
[58] Field of Search .................. 364/513.5; 381/41–43

[56] References Cited

U.S. PATENT DOCUMENTS 4,277,644 7/1981 Levinson et al. .
4,783,809 11/1988 Glinski ................................... 381/43

OTHER PUBLICATIONS

"Syntax driven recognition of connected word by Markov model", pp. 35.5.1–35.5.4, (IEEE International Conference on Acoustics, Speech and Signal Processing, Mar. 19–21, 1984 San Diego, U.S.; vol. 3.

H. Sakoe, "Two Level DP Matching–A Dynamic Programming Based Pattern Matching Algorithm for Connected Word Recognition", IEEE Trans. Acoustics, Speech and Signal Processing, vol. ASSP-27, No. 6, pp. 588–595, Dec. 1979.

P. Brown et al., "Partial Traceback and Dynamic Programming", IEEE Trans. Acoustics, Speech and Signal Processing, vol. ASSP-27, No. 6, pp. 588–595, Dec. 1979.

B. A. Dautrich et al., "On the Effects of Varying Filter Bank Parameters on Isolated Work Recognition", IEEE Trans, Acoustics, Speech, and Signal Processing, vol. ASSP-31, pp. 793–806, Aug. 1983.

J. Bridle et al., "An Algorithm for Connected Word Recognition", Proceedings of the IEEE International Conference on Acoustics, Speech and Signal Processing, pp. 899–902, 1982.

D. Jouvet, et al., "One-Pass Syntax-Directed Connected Word Recognition in a Time-Sharing Environment", CH1945-5/84/000-0389, 1984 IEEE pp. 35.8.1–35.8.4.

J. G. Ackenhusen, "The CDTWP: A Programmable Processor for Connected Word Recognition", CH1945-5/84/0000-0390, 1984.

H. Ney, "The Use of a One-Stage Dynmamic Programming Algorithm for Connected Work Recognition", IEEE Trans. on Acoustics, Speech and Signal Processing vol. ASSP-32, No. 2, Apr. 1984.

J. K. Baker, "The Dragon System–An Overview", IEEE Transitions on Acoustics Speech and Signal Processing, vol. ASSP-23, No. 1, Feb. 1975, pp. 24–29.

J. Peckham, et al., "A Real Time Hardware Continuous Speech Recognition System", CH1746-7/82/000-0863, 1982 IEEE.

L. R. Rabinger, et al., "A Simplified, Robust Training Procedure for Speaker Trained, Isolated Word Recognition Systems", J. Acoust. Soc. AM. vol. 68, No. 5 Nov. 1980 pp. 1271–1276.

L. R. Bahl, et al., "Decoding for Channels with Insertions, Deletions, and Substitutions with Applications to Speech Recognition", IEEE Trans, on Information Theory, vol. IT-21, Jul. 1975, pp. 404–411.

J. C. Spohrer et al., "Partial Traceback in Continuous Speech Recognition", Proc. Int. Conf. Cybemetics and Society, Boston, Oct. 1980.

Primary Examiner—Emanuel S. Kemeny
Attorney, Agent, or Firm—Raymond A. Jenski; Donald B. Southard

[57] ABSTRACT

A continuous speech recognition system employs a grammar tree of alternative potentially recognized word paths. A technique of tracing back through the grammar tree is utilized in determining which partial word path is common to all potential word paths. The common partial word path is deleted and words corresponding to the deleted partial word path are output as recognized words.

56 Claims, 10 Drawing Sheets

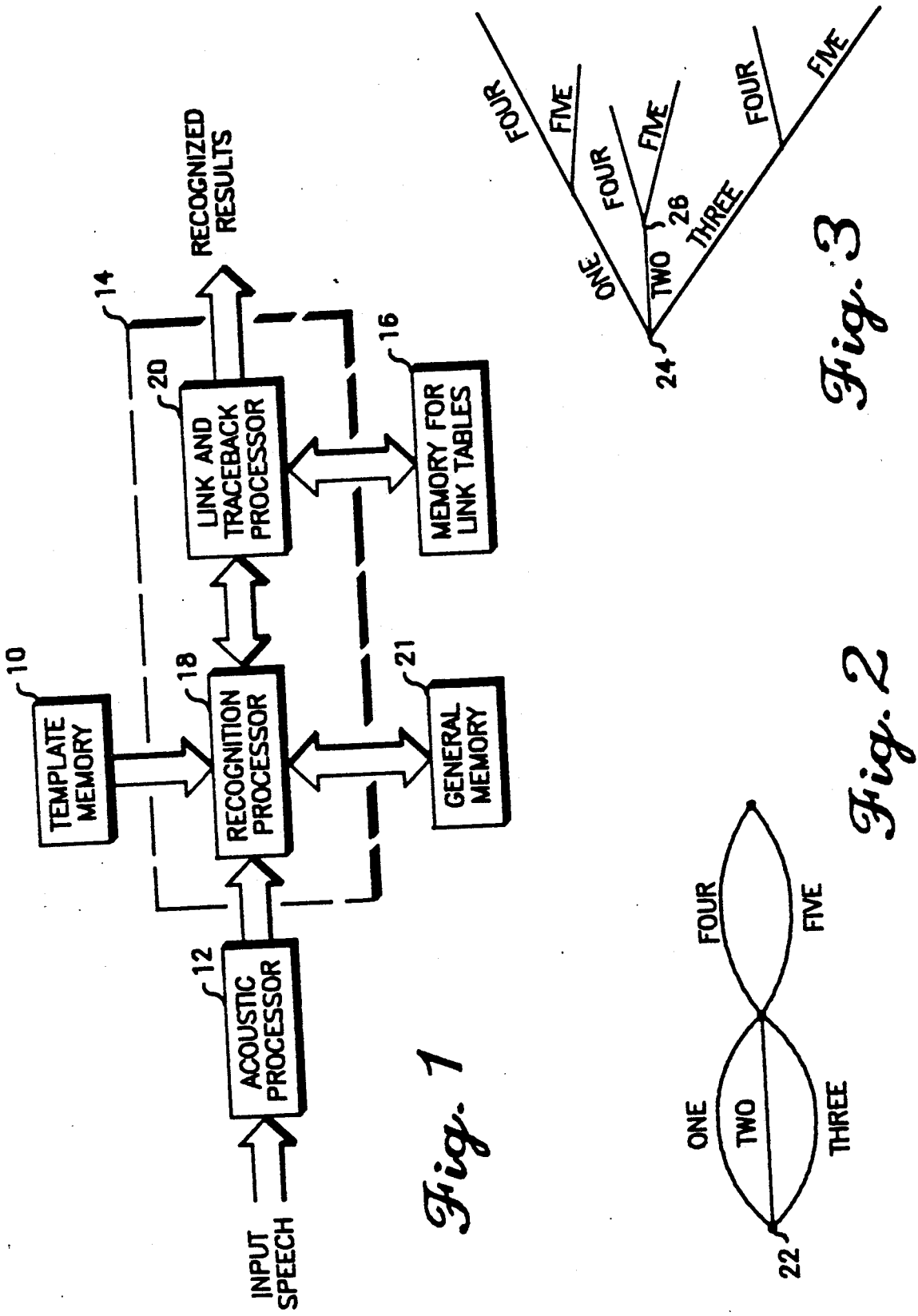

CONTINUOUS SPEECH RECOGNITION SYSTEM

BACKGROUND OF THE INVENTION

The present invention relates to speech recognition, and, more particularly, to speech recognition wherein spoken word end points are not predetermined.

Recognition of isolated words from a given vocabulary for a known speaker has been known for some time. Words of the vocabulary are prestored as individual templates, each template representing the sound pattern for a word in the vocabulary. When an isolated word is spoken, the system compares the word to each individual template representing the vocabulary. This method is commonly referred to as whole-word template matching. Many successful recognition systems use whole-word template matching with dynamic programming to cope with nonlinear time scale variations between the spoken word and the prestored template.

Although this technique has been effective for isolated word recognition applications, many practical applications require continuous word recognition. In continuous word recognition, the number of words in a phrase can be unlimited and the identity of the earlier words can be determined before the end of the phrase, whereas in isolated word recognition, delimiters are used to identify the beginning and ending of input patterns and recognition occurs one word at a time. Moreover, a continuous speech recognition system must distinguish an input pattern from other recognizable patterns, background noise, speaker induced noise such as breathing noise, while isolated recognition cannot usually tolerate other recognizable patterns at the beginning or ending of the word.

In "Two level DP Matching—A dynamic programming based pattern matching algorithm for connected word recognition", H. Sakoe, IEEE Trans. Acoustics, Speech and Signal Processing, Vol.ASSP-27, No.6, pp.588–595, Dec. 1979, the method of whole-word template matching has been extended to deal with connected word recognition. The paper suggests a two-pass dynamic programming algorithm to find a sequence of word templates which best matches the whole input pattern. In the first pass, a score is generated which indicates the similarity between every template matched against every possible portion of the input pattern. In the second pass, the score is used to find the best sequence of templates corresponding to the whole input pattern.

This extended method has distinct disadvantages. One disadvantage of this technique is the amount of computation time it requires. Depending on the specific design requirements, this limitation may create unwarranted need for an expensive high-speed processor.

Another disadvantage of this method is that the endpoints of the input pattern must be predetermined and the whole input pattern must be stored in the system before any accurate template matching can occur. For an input pattern of any significant length, recognition response time would be substantially degraded. Also, errors in endpoint detection will seriously degrade recognizer performance. Further, the memory required to store this information may become excessive.

In "Partial Traceback and Dynamic Programming", P. Brown, J. Spohrer, P. Hochschild, and J. Baker, IEEE Trans. Acoustics, Speech and Signal Processing, Vol.ASSP-27, No.6, pp.588–595, Dec. 1979, a technique is described which allows for continuous speech recognition of arbitrarily long input patters without predetermination of endpoints. This is accomplished using a technique called partial traceback. Partial traceback allows outputting of recognized words prior to completion of the complete input pattern without sacrificing recognizer performance. However, the partial traceback technique described appears to be processor burdensome and cumbersome to implement.

Accordingly, there is a need for a continuous speech recognition system which can easily be implemented, yet can operate efficiently and inexpensively in real time.

OBJECTS AND SUMMARY OF THE INVENTION

Accordingly, it is an object of the present invention to provide an arrangement and method of speech recognition which can be implemented for real time applications to recognize continuous speech with inexpensive hardware It is a further object of the present invention to provide an arrangement and method of speech recognition which allows efficient memory management of speech recognition memory during the recognition process.

It is a further object of the present invention to provide an arrangement and method of speech recognition which allows efficient traceback through a software linked network representing potentially matching templates for the recognition process.

It is still a further object of the present invention to provide an arrangement and method of speech recognition which allows input speech to be recognized before the whole string is input.

In brief, the present invention pertains to a speech recognition system, wherein input frames are processed against prestored templates representing speech, and templates, which are under consideration as potentially recognized are individually recorded in a linked network, each link record generally having ancestor and descendant link records. One arrangement and method for recognizing speech patterns includes providing temporary pointers for the link records, and tracing back through the linked network using the temporary pointers for selecting link records to connect potentially recognized templates corresponding to the link records. Those link records with ancestor records having two or more potentially recognized descendants have their temporary pointers removed. The remaining link records in the network, which are still labeled with temporary pointers, have their associated words output as recognized words.

Another aspect of the present invention pertains to a similarly arranged speech recognition system as above, but is aimed toward management of speech recognition memory. This aspect of the present invention comprises means for storing the link records as indexed data sets with each data set including a symbol representing a template, a sequence indicator representing the relative time the link record was stored and a pointer indicating a link record in the network from which it descends. The table is composed of free record space and established record space, wherein the link records ar ⓡs-tored in the established record space. Further, means are employed for identifying those link records which are part of unambiguously recognized network paths. The unambiguously recognized link records are output (displaced) as recognized, and those link records displaced from the established record space become available as free record space for subsequently storing additional link records in the linked network.

BRIEF DESCRIPTION OF THE DRAWINGS

The features of the present invention which are believed to be novel are set forth with particularity in the appended claims. The invention, together with further objects and advantages thereof, may best be understood by making reference to the following description taken in conjunction with the accompanying drawings, in the, several figures of which like reference numerals identify identical elements, and wherein:

FIG. 1 is a hardware block diagram of a speech recognition system depicted in accordance with the present invention;

FIG. 2 is a graphical representation of a recognition grammar model illustrating one aspect of a speech recognition system implemented in accordance with the present invention;

FIG. 3 is a graphical representation of a speech grammar tree illustrating an enumeration of all possible paths through the speech grammar model of FIG. 1;

FIGS. 6a, 6b, 6c and 6d comprise a flowchart more particularly illustrating block 44 of FIG. 4a;

DETAILED DESCRIPTION OF THE PREFERRED EMBODIMENT

Figure 4A:
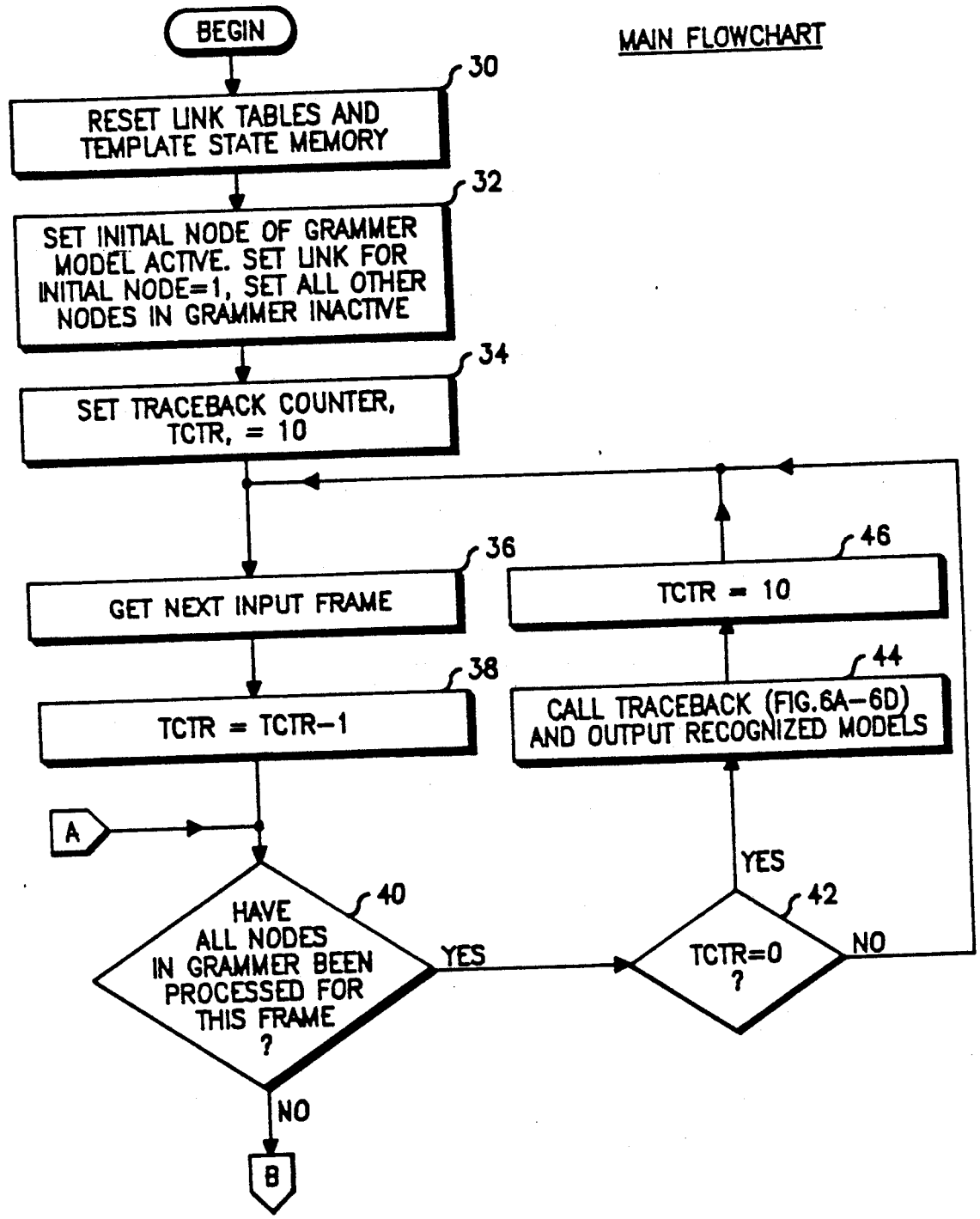
FIGS. 4a, 4b and 4c comprise a flowchart depicting a set of steps which may be performed to implement a recognition process in accordance with the present invention.

Referring to FIG. 1, shown is a block diagram of a speech recognition system which can be used to implement the present invention. The diagram includes template memory 10 which contains a prestored vocabulary. Formation of a typical prestored vocabulary is described in "A simplified, robust training procedure for speaker trained, isolated word recognition systems", L. R. Rabiner and J. G. Wilpon, Journal Acoustic Society of Amer., 68(5) November 1980. An acoustic processor 12, such as is described in "On the effects of varying filter bank parameters on isolated word recognition", B. A. Dautrich, L. R. Rabiner and T. B. Martin, IEEE Trans. on Acoustics, Speech and signal Processing, pp.793-806 Vol. ASSP-31, August 1983, may be used to convert input speech into a series of speech segments, commonly referred to as "frames". Each frame represents a time segment of input speech, usually in the form of LPC or filter bank data. The frames from the acoustic processor are passed to recognizer 14.

The recognizer 14 accesses word templates from the vocabulary prestored in template memory 10 and processes each input frame from the acoustic processor 12 with segments of the word templates. Such a technique is inherent to many speech recognition system and may be referred to as "template processing".

The recognizer 14 bidirectionally accesses a second memory, memory for link table 16. Memory for link table 16 is used for storing five related arrays. The arrays are further discussed below.

The recognizer 14 may be implemented by using two processors, a recognition processor 18 and a link and traceback processor 20. The recognition processor 18 handles all template matching, grammar, control and communication with the link and traceback processor 20. The link and traceback processor 20 is used to maintain the memory for link tables 16. This function includes recording potential template matches while the continuous speech is being input, storing related information in the memory for link tables 16, freeing space in memory for link tables 16 for additional information and outputting recognizing results as input speech is identified. The functions of the recognition processor 18 and the link and traceback processor 20 may be combined into one processor or may be separated, as shown, whereby the recognition processor 18 may be implemented as specifically described in "An Algorithm for Connected Word Recognition", J. Bridle, M. Brown and R. Chamberlain, Proceedings of the IEEE International Conference on Acoustics, Speech and Signal Processing, pp.899-902, 1982. The link and traceback processors may be implemented with an 8 bit processor such as Motorola's MC6801, when used in accordance with the present invention.

MODELING THE GRAMMAR

Referring now to FIG. 2, a simplified recognition grammar model is shown to illustrate all possible word sequences which may be recognized by the system. The model is referred to as "simplified" because the vocabulary shown is grossly limited, for the purpose of illustration, from what would typically be required. In FIG. 2, there are six possible word strings, each comprising two words (further discussed with FIG. 3). In a typical speech recognition system, the grammar model may include many more possible word strings, each of which may contain several words. The topology of the grammar model is stored in general memory with pointers pointing to the corresponding templates in template memory. Each node in the grammar model has associated with it, stored in general memory, a link pointer designating the node from which template matching originated and its associated accumulated distance.

MODELING THE GRAMMAR PATHS

In FIG. 3, each of the six possible word strings from FIG. 2 is enumerated in a tree diagram. There are three possible first words, "one", "two" and "three". Each possible first word may be followed by two possible second words, "four" and "five". During template matching, i.e. while input frames are being compared against prestored word templates, the recognition processor recognizes potential "word ends". A potential "word end" is found when a sequence of input frames potentially matches a word template. The identified word template is appended to the tree diagram through link information stored in the link table, previously mentioned, and an accumulated distance indicating a measure of similarity between the sequence of input frames being processed and the template(s) leading up to the node. For example, given the vocabulary string possibilities of FIGS. 2 and 3, when an input frame sequence is identified as potentially matching the word "two", "two" is added to the tree diagram from the initial node, node 24. FIG. 3 illustrates that after additional frames are input and processed, the word "one" has become a potential match; hence, it is next added to the tree diagram also at node 24. Next the word "three" is added to the tree diagram, then "four" appended to node 26, followed by "five" appended to the same node, etc. This continues with each potential matching template added to the tree diagram as it is identified in time.

The term "tree node", or reference to a node in the tree diagram, will be used interchangably with the term link(ed) record. In general, a link record is a data set stored in memory defining a connection in the tree diagram, including identification of the particular tree node and relation to the previous node in the tree topology.

For each potential word end frame, a new entry, or link record, is added to the link table, corresponding to a link in the representative tree diagram. Quite often, a word template, typically represented as a sequence of frames (representing states) in the form of a state diagram, will have multiple potential word ends as input frames are being processed. Each time a potential word end is detected, the corresponding template is added to the tree as a new link. Further, each state of each template has recorded an accumulated distance processed through the present input frame, and a link pointer pointing to the link record in the link table corresponding to the link in the tree from which decoding for that template began. For further information on template matching, reference may be made to "An Algorithm for Connected Word Recognition", supra.

Unfortunately, when the vocabulary is large, continuously appending templates to the tree causes problems. First, it delays recognition response time. The longer the input frame sequence, the longer the operator must wait before the system recognizes and takes action upon the recognized words.

Second, continuously appending templates requires extensive memory for linking the tree diagram information. For complex grammar models and several potential word end frames for each potential word match, the memory requirements for the link table (tree) will grow at a very fast rate. If the growth rate is too large, memory requirements may become impractical.

The present invention overcomes these problems by uniquely structuring a link table and maintaining it in a highly efficient manner.

THE LINK TABLE

The link table represents all potential word sequences under consideration as matches in the form of a tree network, similar to FIG. 2. The word sequences are, in effect, concatenated templates having potential word ends detected during template matching. Establishing the network in this fashion allows analysis of those links that are unambiguously part of all potential word sequences. This process of analysis is referred to as traceback. Properly employed, traceback also allows an efficient method of releasing link records which are no longer part of any sequence still under consideration.

Each link, or nodal tree connection, of the tree diagram requires several types of information to be stored. This information is stored in L-ACT, L-FWRD, L-BACK, L-WORD and L-PTR arrays in memory for link table 16 of FIG. 1. In the current embodiment, each array is 255 bytes long and is positioned one byte past a 256 byte boundary to allow efficient access. The corresponding elements from each array constitute a "link record". The link records are chained into 2 linked lists. One list contains free link records, i.e. empty record space available for additional links. The second list is the established list and it contains records for links currently being used. These lists are chained together by L-PTR array, where one entry in L-PTR indicates the next link record in the table, from the established or free list, where each record contains one byte from each of the five arrays. For example, if, for a given link record in the established list, the corresponding byte of the L-PTR array contains the binary representation of the number "2", the next record of the established list would be found in the second byte of all five arrays. A "zero" entry in the L-PTR array defines the end of the linked list.

L-BACK and L-WORD arrays contain the actual link information. L-BACK contains the pointer to the previous link in the decoding path, i.e. the previous node in the tree diagram, while L-WORD contains a symbol representing the word decoded ending at the current link. For example, in FIG. 3, after appending the word "four" to tree node 26, L-WORD would contain an 8-bit symbol representing the word "four" and L-BACK would contain a pointer pointing to the link record corresponding to tree node 26. The other two arrays, L-ACT and L-FWRD, are used to "traceback" through the decoding paths (potential word sequences. L-ACT is used to indicate decoding paths still under consideration as a potential match, while L-FWRD is used to point to the subsequent node in the tree diagram, the inverse of L-BACK. Hereinafter, those link records flagged as being under consideration as being part of a potentially recognized path (active path) will be refered to as "active" link records.

The link records provide traceback information so that the path through the word model used to reach that state can be determined. Traceback also allows the tree to be pruned of nonuseful information. This is necessary to prevent information from excessively accumulating in memory. Traceback is also used to output words which are unambiguously recognized, i.e., common to all active paths. The L-BACK entries in the link table point to previous entries in the table, which correspond to previous connected nodes in the tree diagram. Hence, traceback refers to the process of tracing back through the tree diagram to a point, or tree node, where all paths merge. The concept of tracing back to a point where all paths merge is well known to those skilled in the art, for a general description "traceback" reference may be made to "Partial Traceback and Dynamic Programming", supra.

The above arrays are listed below for reference during discussion of the subsequent figures.

L-PTR: 255 bytes, each byte available for a pointer indicating the previous link record appended to the tree diagram (table) as a function of time for the established list. It is also used to chain free link records in the free list.

L-BACK: 255 bytes, each byte available for a pointer indicating the previous link record in the tree diagram.

L-WORD: 255 bytes, each byte available for a symbol indicating the potentially recognized word corresponding to the present link record.

L-ACT: 255 bytes, each byte available for indicating whether or not the present link record is active (used during traceback).

L-FWRD: 255 bytes, each byte available for a pointer indicating the subsequent valid link record in the tree diagram (used during traceback).

In addition to the above arrays, five other pointers are used. They are:

HEAD: a one byte pointer for indicating the first, i.e. the most recently added, link record in the established list, as chained by the L-PTR array.

FREE: a one byte pointer for indicating the first link record of the free list, as chained by the L-PTR array.

PTR: a one byte pointer for referencing the current tree node being processed.

TMP1 and TMP2: each is a one byte temporary pointer used in the recognition flowchart.

Structurally, presuming a table with only 10 entries in the established list, these arrays may be arranged as follows.

| Rec'd # | L-PTR | L-BACK | L-WORD | L-ACT | L-FWRD |
|---------|-------|--------|--------|-------|--------|
| 1       | 2     | 2      | four   | 0     | 0      |
| 2       | 3     | 3      | four   | 0     | 0      |
| 3       | 0     | —      | —      | 0     | 0      |
| 4       | 1     | 2      | one    | 0     | 0      |
| 5       | 6     | 4      | three  | 0     | 0      |
| 6       | 10    | 10     | six    | 0     | 0      |
| 7       | 8     | 5      | three  | 0     | 0      |
| 8       | 5     | 5      | nine   | 0     | 0      |
| 9       | 4     | 1      | zero   | 0     | 0      |
| 10      | 9     | 4      | one    | 0     | 0      |

The entries of the above table are illustrated in a tree diagram in appendix A. It should be noted that HEAD points to record #7, and the "0" in the L-PTR entry for record #3 indicates the last record on the list. FREE is not illustrated.

L-PTR allows the records in the established list to be entered by simply removing the record from the free list and designating its L-PTR entry to point to the HEAD record, and updating HEAD and FREE. When a record is deleted from the table's established list during traceback, that record becomes available without rearranging the table by linking the record entry to the free list, and linking over the removed record for the established list using the L-PTR entries. The entries for L-ACT and L-FWRD are only used during traceback and are otherwise always reset to zero.

THE RECOGNITION FLOWCHART

Figure 4B:
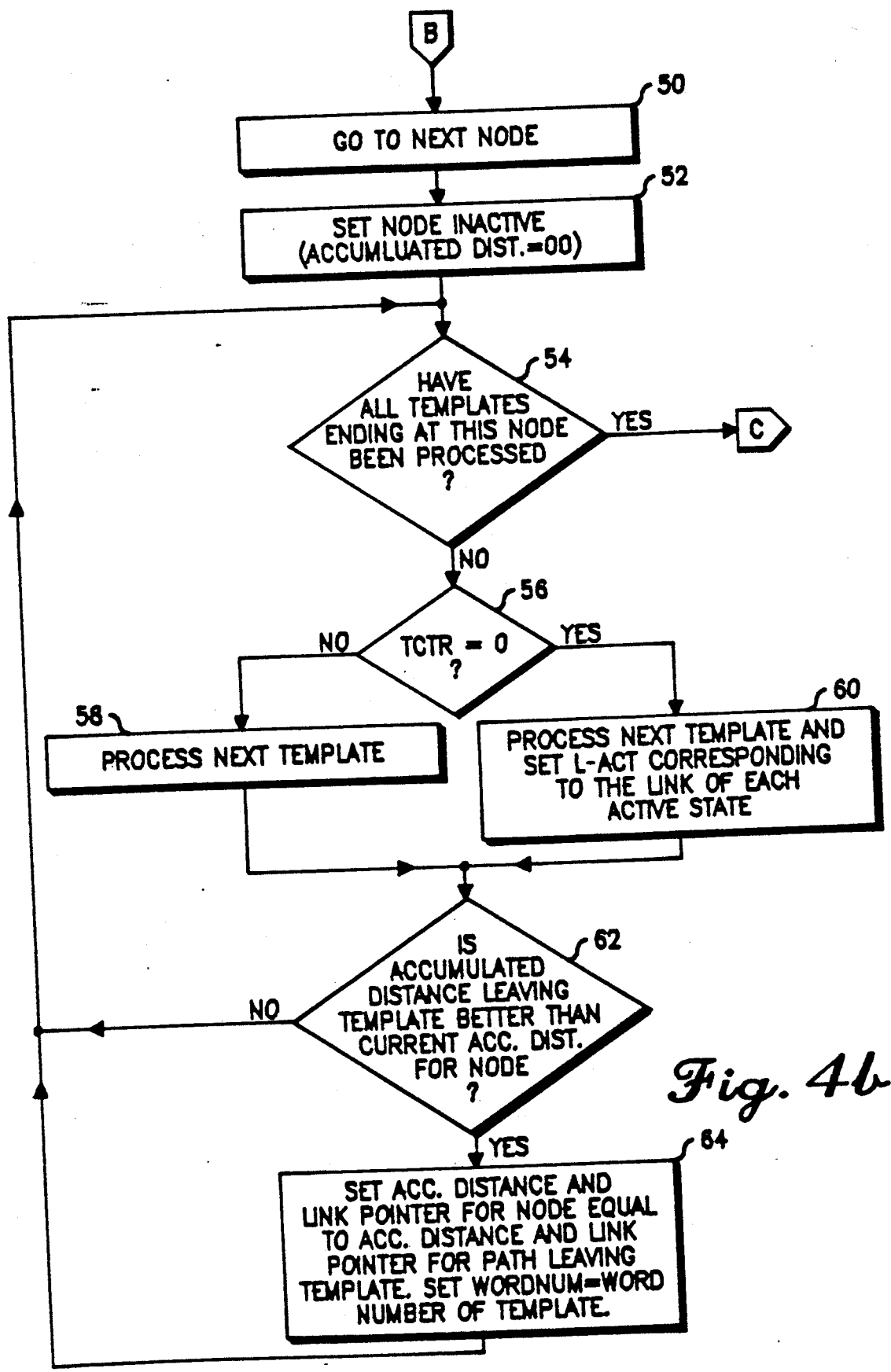
Figure 4C:
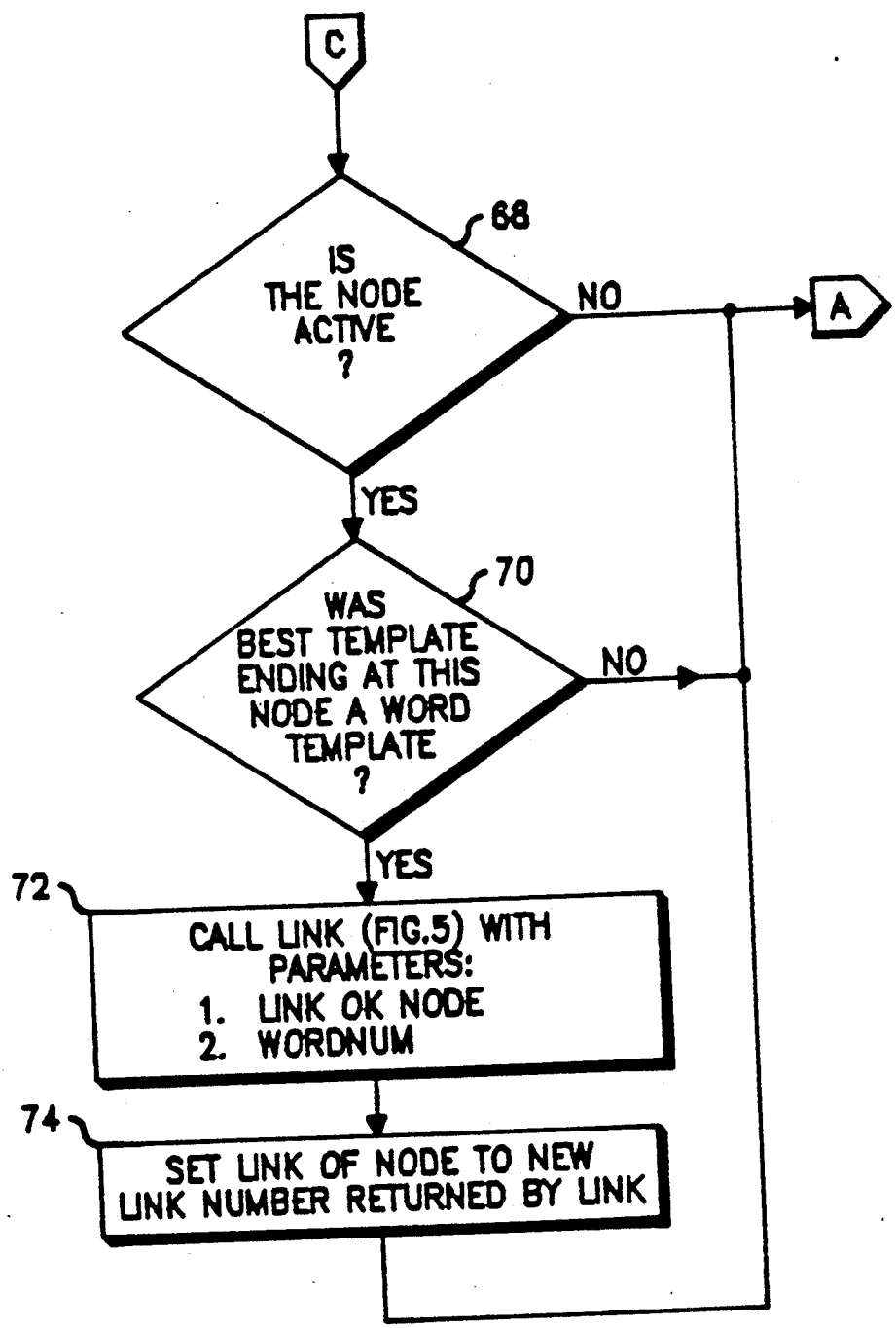

Referring now to FIGS. 4a through 4c a recognition flowchart is shown in accordance with the present invention. The flowchart of FIG. 4a begins at block 30 by resetting the link table and its associated pointers. The reset procedure includes setting each byte of L-FRWD and L-ACT equal to 0, setting HEAD pointer equal to 1 to indicate the beginning of the established list, and setting L-PTR(1) and L-PTR(255) equal to 0 to indicate the end of the established and free lists, respectively. Also, template state memory, typically stored in general memory, is set inactive. Accordingly, the first record comprises the established list, and records 2 through 255 are chained using L-PTR entries to form the free list, where HEAD points to the beginning of the established list and FREE points to the beginning of the free list (link record #2).

In block 32 of FIG. 4a, the recognition grammar model is initialized. The initialization includes marking the initial node of the model active. This may be done by arbitrarily assigning it a low accumulated distance measure to indicate the starting point in the grammar. The link pointer for the initial node is set to 1, corresponding to the first entry initialized in the link table. Conversely, all other nodes in the grammar model are initialized as inactive. A node may be set inactive by setting the accumulated distance for the node equal to infinity indicating that there is no likelihood of being at this node at the start of processing.

In block 34 a traceback counter is initialized to 10. The traceback counter is used to periodically indicate that the traceback process should be performed. In this embodiment, traceback is performed after every 10 input frames are processed.

In block 36 the next input frame is input to the system for template matching, previously mentioned. The remaining steps of this flowchart all pertain to the processing of the present input frame.

The traceback counter is decremented in block 38 to indicate a frame has just been input.

At block 40 a test is performed to determine whether or not all nodes of the grammar model have been processed. In other words, whether or not the input frame has been processed for the entire grammar model. If all nodes of the grammar model have been processed, flow proceeds to block 42 to determine if the traceback counter is indicating that traceback should be performed this frame. If so, traceback is performed by calling the traceback subroutine 44, subsequently discussed in FIGS. 6a through 6d. Following traceback, the traceback counter is reset, block 46, before processing the next input frame at block 36.

If all nodes of the grammar model have not been processed, flow proceeds from block 40 of FIG. 4a to block 50 of FIG. 4b. At block 50, processing of the recognition grammar model proceeds to the next node. If no nodes have been processed for this frame, "the next node" is the first node in the grammar model. Thereafter, in block 50, "the next node" refers to the node following or a node parallel to the one just processed. In particular, the ordering of nodes for processing must be such that a node is not processed until the originating nodes for all templates terminating at that node have been processed for the current frame. This is to insure that node accumulated distances and links have been updated for originating nodes of templates before these templates are processed.

In block 52, the new node is set inactive. This may be done by setting an accumulated distance associated with the node equal to infinity.

A test is performed in block 54 to determine whether or not all templates ending at this node have been processed. Later it will be recognized that each template immediately preceding each node of the grammar model is processed before moving to another node. If all the templates ending at this node have been processed, flow proceeds to block 68 of FIG. 4c, subsequently discussed. If all the templates have not yet been processed, flow proceeds to block 56 to determine if, for the present input frame, traceback is required. Hence, the traceback counter, is compared to zero.

At this time, it may be helpful to summarize the processing of the recognition grammar model thus far indicated by the recognition flowchart. Referring once again to FIG. 2, initial node 22 of the grammar model is set active and corresponding link table entry is initialized to indicate a reference from which all potential grammar paths (tree branches) eminate. For each input frame processed, the grammar model is progressed through one node at a time from the beginning node to the ending node. Further, for each node of the grammar model, each template ending at that node is processed one template at a time, as will be discussed. Accordingly, for each input frame, each node is processed and, for each node, each template ending at the node is processed.

Regardless of whether or not traceback is required, as indicated in block 56, the next template is processed in either block 58 or block 60. Template matching at either block entails updating the accumulated distances and link pointers for all the states of the template based on the current input frame, the template, and the accumulated distances and link pointers for all the states of the template as well as the accumulated distance and link pointer for the originating node of the grammar model. If there is a potential word end for this template for the current frame, then an accumulated distance and link pointer will be generated corresponding to the potential word end. "An Algorithm for Connected Word Recognition", supra.

If flow proceeds from block 56 to block 60, indicating that traceback is being processed this frame, in addition to the template processing described above, all L-ACT entries, which correspond to the link records pointed to by the link pointers for each active state in the template, are set nonzero. The "active" template states are those which have a finite accumulated distance.

Flow next proceeds to block 62, where a test is performed to determine whether or not the accumulated distance associated with the template is better than the current accumulated distance corresponding to the best previously processed template ending at the node for this frame (this will be infinity if this is the first template processed for this node). The outcome of this test is true only when template matching of the present input frame suggests a potential word end of the word template. As previously mentioned, a potential word end indicates that a sequence of input frames may correspond to, or match, a word template prestored in template memory.

If the template does not have a potential word end for the current input frame, then its associated accumulated distance will be infinite.

Flow proceeds back to block 54 if the most recent template processed is not found to have an accumulated distance which is better than the previous accumulated distance stored for that node, where additional templates ending at the node are processed.

If the accumulated distance for the most recent template processed is found to be the best of those yet processed for the node, flow proceeds to block 64 to record this information. In block 64, the accumulated distance and the link pointer corresponding to the above processed template is recorded for the node of the grammar model. Additionally, the word number, or symbol, representing the template is recorded The word number is recorded for subsequently outputting the word if it is later determined to have been recognized. From block 64, flow proceeds to block 54 as discussed above.

Once it is indicated at block 54 that all the templates ending at the node have been processed, flow proceeds to block 68 of FIG. 4c. In FIG. 4c, blocks 68 through 74 determine whether or not a link record should be added to the tree, and, if so, the link record is added to the tree through the link arrays.

In block 68, a test is performed to determine if the node of the grammar model is active. The only manner in which the node could have become active is if at least one word template processed for that node has a potential word end for the current input frame. If the node is inactive, flow proceeds to block 40 of FIG. 4a to seek another node to process for the current frame. Otherwise, flow proceeds to block 70.

Figure 5:
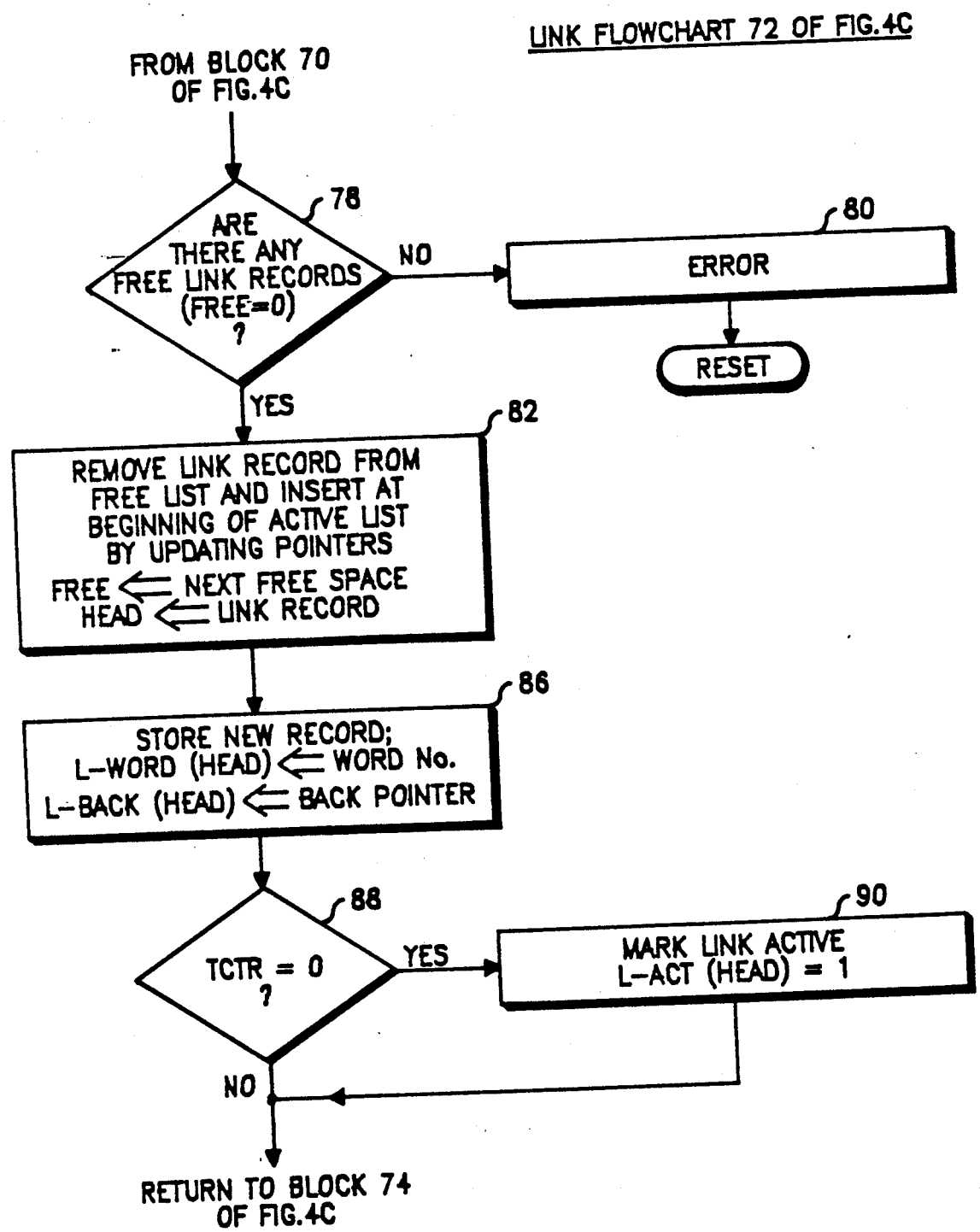
FIG. 5 is a flowchart more particularly illustrating block 72 of FIG 4c.

In block 70, a test is performed to determine whether or not the best template ending at the node was a word template. In certain instances, it may have been another type of template such as a silence template, in which case flow would proceed to block 40 of FIG. 4a. Silence templates are not added to the tree since it is typically not necessary to output silence as having been recognized. If the best template ending at this node was a word template, LINK subroutine, FIG. 5, is called to add a link record to the tree diagram. Parameters are passed to LINK subroutine indicating the link pointer corresponding to the originating link record for the template and the word number representing the template.

After the link record is added, discussed below, a new link pointer is returned from LINK. In block 74, the link pointer for the current node of the grammar model is set to the link pointer passed from LINK.

Following block 74, flow proceeds to block 40 of FIG. 4a to check if all the nodes of the grammar tree have been processed for the current input frame.

ADDING A LINK TO THE TREE

Referring now to FIG. 5, as previously mentioned this subroutine adds a link record to the tree diagram as defined by the link arrays. The parameters which are passed to the subroutine are the word number and the link pointer corresponding to the node of the tree from which it is being added.

In block 78, a test is preformed to determine whether or not there are any free link records. This is done by comparing FREE to 0. If FREE equals 0, there are no more free link records. Discussed above, the records in the link arrays are chained together by L-PTR array, which comprises free link records and established link records. Free link records allow additional link records to be added to the tree diagram. Accordingly, if there are no free link records, all the link records are being used and flow proceeds to block 80 where an error is reported and the system is reset. It should be noted that this step in block 80 is only used as a protection from unusual conditions which might lead to a link table overflow. Under normal conditions, the invention will prevent the absence of free link records by using a link table of adequate length.

Given one or more free link records, flow proceeds to block 82 where the next available link record is removed from the free list and inserted at the top, or beginning of the established list by updating the HEAD and FREE pointers. FREE is set to point to the index of the next free record and HEAD is set to point to the link record just added. L-PTR of the new HEAD link record is set to point to the previous HEAD link record to chain the new record onto the established list.

In block 86, since HEAD points to the link record just added in the established list, the word number passed to this subroutine is recorded for the new record in the L-WORD array. Also, the link pointer passed to the subroutine is recorded for the link record in the L-BACK array.

At block 88, a test is performed to determine whether or not traceback is required for the current input frame. If so, flow proceeds to block 90 where the newly added link record is marked active. This is done by setting the L-ACT array for the record equal to one. If traceback is not required for the current input frame, the subroutine ends and flow returns to block 74 of Fig. 4c.

TRACING BACK THROUGH THE TREE

Referring now to FIGS. 6a through 6d, the traceback subroutine, i.e., block 44 of FIG. 4a, is shown in detail. The traceback subroutine searches through the tree diagram for words which have been identified as potential matches, and determines whether or not there is any ambiguity to the uniqueness of the match. Those words which have been uniquely identified are output from the recognition system as recognized words. Further, the traceback subroutine removes all dead link records, i.e. those records that are no longer under consideration as a potential match, to the free list to make memory available for future link records. Before entering TRACEBACK, L-ACT is set, or flagged, for all active link records as described above. At the start of traceback, active link records represent the ends of all paths through the tree which are still under consideration. The basic concept of traceback is to "traceback" through the tree from the ends of all active paths (marked initially by L-ACT array) to find where all active paths merge. The part of the tree which is common to all active paths represents the unambiguous partial path and those words corresponding to this unambiguous partial path may be output as being recognized. During traceback the L-FWRD array is used to chain partial paths in the forward direction (toward the ends of the tree). As these partial paths are built the base node for each partial path is set active via the L-ACT array. When an attempt is made to extend a partial path (using L-BACK information) from a current node to a previous node which is already marked active, then more than one possible path eminates from this previous node and the partial paths from both nodes are deleted (forward pointer chains (L-FWRD) reset to 0). All nodes marked active are processed this way. The order of node processing is in the reverse order of time sequence the link records were added into the link tables. This ordering is inherent in the structure of the established list. The last node to be processed will be the root node of the tree. At this point the forward chain (partial path) emanating from the node will represent the unambiguous partial path and the corresponding recognized words may be output. The traceback procedure also "cleans up" after itself in that upon completion the L-FWRD and L-ACT arrays will have been reset to zero. Further, all link records not on any active path, as well as the link records on the unambiguous partial path which has been outputted, will be returned to the free list.

Figure 7:
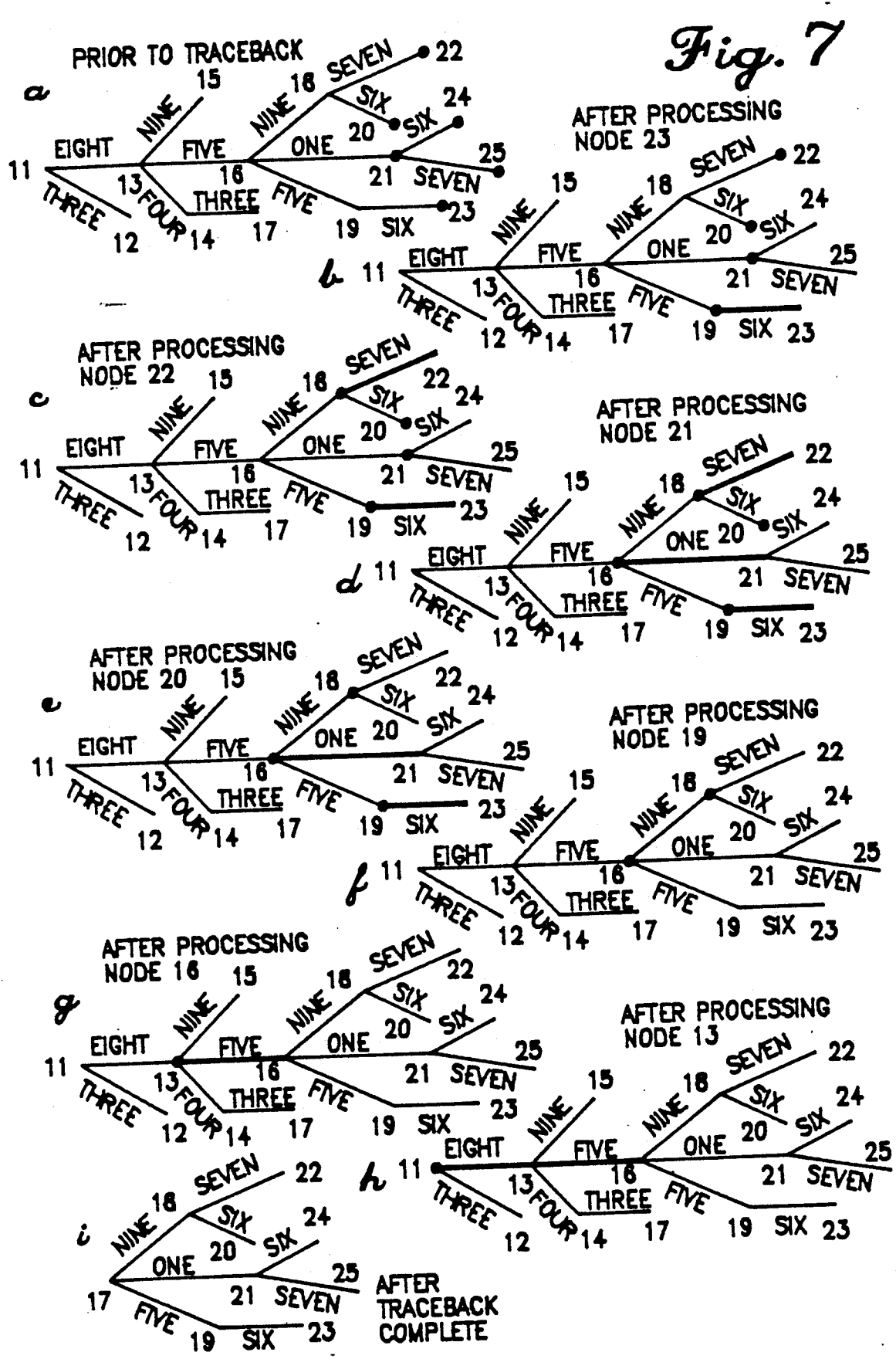
FIG. 7 comprises a series of grammar tree diagrams illustrating an example of "traceback" in accordance with the present invention.

Before describing the traceback subroutine in detail, it may be helpful to step through an illustrated example. Referring to FIG. 7, such an example is depicted as a series of tree diagrams, A through I.

In diagram A, the tree is shown prior to traceback, active link records, i.e. those links that have active word links emanating from them are marked to the right of the link with a bold dot. The first step of traceback is to determine the most recent active link record as added in time, in this case the node marked 25. A test is performed to determine if there is an active node immediately preceding this node in the tree. If so, there is ambiguity as to which path, as in this instance via node 25 or node 24, traces back to node 21. When ambiguity occurs, the forward pointer for the nodes of ambiguity have their chained forward pointers removed if they exist. This is done by inserting a zero in the L-FWRD array for each subsequent link record. In this instance, neither node has a forward pointer, i.e. L-FWRD=0.

The next most recently added active link record is then identified, node 24. Node 24's preceding link is also noded 21 and is processed similar to the processing for node 25, discussed above.

The next most recently added active node is node 23. Since it does not have a preceding node which is active, the traceback process sets the preceding node active and records a forward pointer (L-FWRD) for the preceding node, node 19, equal to the node presently being processed, node 23. Diagram B illustrates tree diagram A after processing node 23, with the forward pointer added to node 19 depicted as a bold line. It should be noted that after each node is processed, its L-ACT entry which indicates that it is an active node, is removed. Hence, tree diagram B no longer depicts nodes 23, 24 and 25 as active.

Node 22 is the next most recently added entry with an active node. It does not have an active preceding node. Therefore, as was done for node 23, the forward pointer for node 18 is set equal to node 22, and node 18 is marked active. Diagram C illustrates the tree after processing node 22.

Node 21 is handled similar to node 22, since its preceding node is not active, shown in diagram D.

Node 20 is the next active node to be processed. The node preceding node 20 is active, which indicates ambiguity. When ambiguity occurs, the forward pointer for the nodes of ambiguity, in this case nodes 18 and 20, have their forward pointer chains removed. In this case only node 18 has a forward pointer. As indicated in the bold line after node 18, the forward pointer for node 18 has been set equal to node 22. Hence, in diagram E, the bold line is removed, by setting the forward pointer for node 18 equal to 0.

Node 19 is the next most recently added entry with an active node. Since its preceding node is active, ambiguity requires that the forward pointer chains for both nodes 16 and 19 be removed, as illustrated in Diagram F.

Node 18 is processed next Since its preceding node, 16, is active but neither nodes 16 or 18 has a forward pointer, no action is taken except removing the bold dot indicating the activity of the node.

The next active node is node 16, which has a preceding node which is not active In this case, the traceback process sets the preceding node active and records a forward pointer for the preceding node, node 13, equal to the node presently being processed, node 16. Diagram G illustrates tree diagram A after processing node 16.

Node 13 is handled similar to node 16. Hence, in diagram H the tree is shown with only node 11 marked active and only forward pointers for nodes 11 and 13 remain.

Once the traceback process arrives at the root node in the tree (node 11), that node which is not preceded by any other nodes, it outputs words chained through the forward pointers as recognized words. This is done by sequentially looking to those link records having chained forward pointers starting at the root node, in L-FWRD. As illustrated in Diagram I, the link records which record "eight" and "five" in their respective L-WORD arrays are output. Additionally, those link records representing the links between nodes 11 and 16, in diagram H, are removed from the established list and linked into the free list, as indicated by L-PTR array and FREE pointer, at which time the new root node of the tree is node 16. The remaining tree is illustrated in Diagram I, which is used as the additional input frames are processed, i.e. where flow returns to block 46 or FIG. 4a in the recognition flowchart.

Figure 6A:
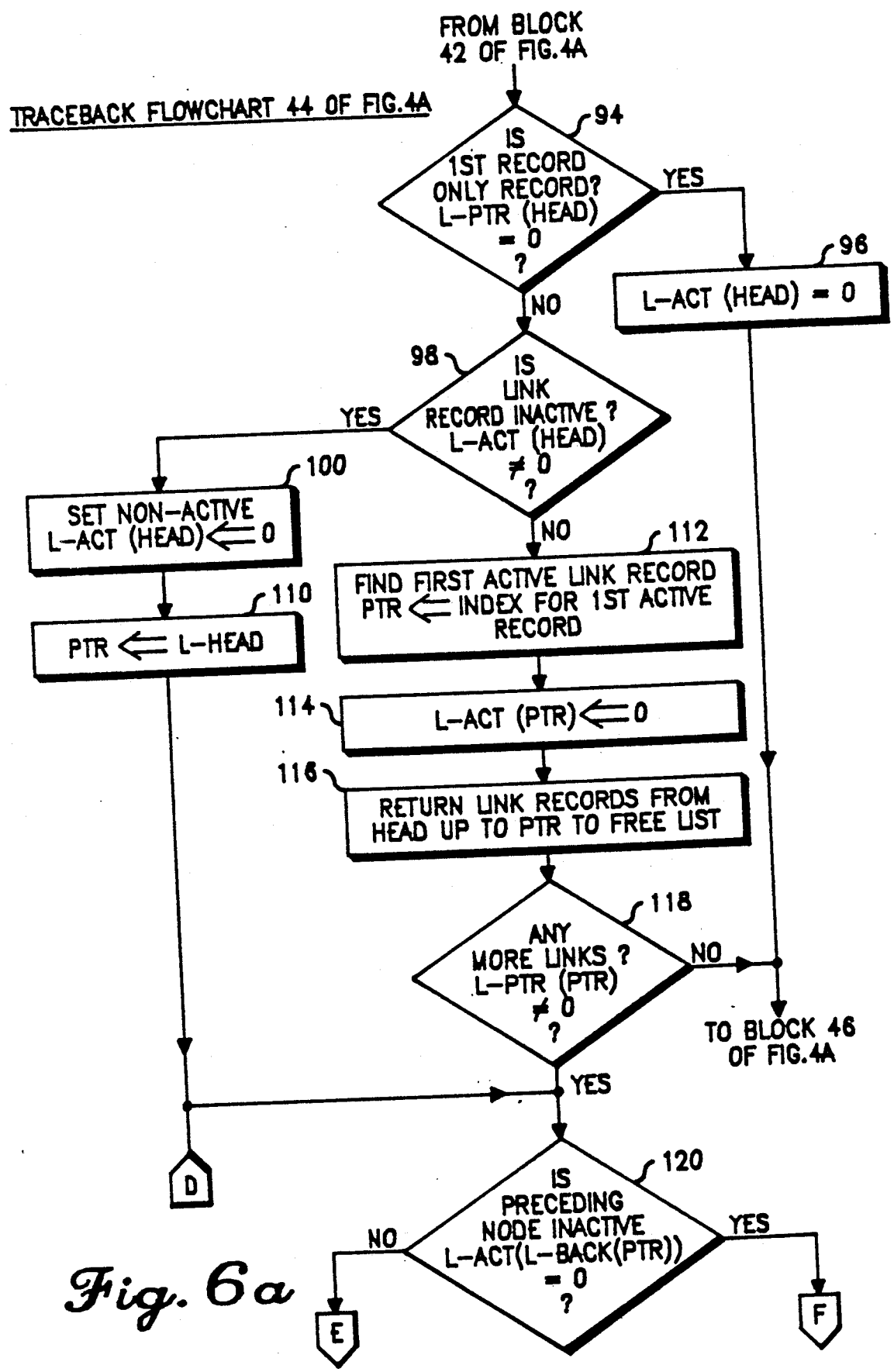

Referring now to FIGS. 6a-6d, the traceback flowchart will be discussed in detail. In FIG. 6a, the link table is searched for the most recently added link record which is active. In block 94, a test is performed to determine if the first record in the link table is the only record in the established record list. This is done by looking into the index of array L-PTR which is pointed to by HEAD. As previously mentioned, HEAD contains the index for the most recently added link record. If the L-PTR entry corresponding to HEAD is equal to zero, the chain is terminated and no additional records are in the table, in which case, flow proceeds to block 96 where the corresponding L-ACT entry is set inactive. From block 96, the subroutine returns to the recognition flowchart at block 46 at FIG. 4a.

In the case where there are additional link records in the table, a test is performed in block 98 to determine if the first link record is active. The link record is active if its corresponding L-ACT entry is not equal to zero.

If the link record is active, flow proceeds to block 100. In block 100, to indicate that the link record has been accounted for, the link record is set inactive. Flow then proceeds to block 110 where the record pointed to by HEAD is stored in the temporary pointer, PTR. From block 110, flow proceeds to block 120, subsequently discussed.

If the first link record turns out to be inactive, flow proceeds from block 98 to block 112. In block 112, L-PTR is stepped through until the first active link record is found, at which time the index for that active record is stored in PTR. In block 114, the active indicator is cleared to indicate processing for that link record, similarly done in block 100.

In block 116, those link records found inactive, as indicated between pointers HEAD and PTR, are returned to the free list for future use.

In block 118 a test is performed to determine if there are any more links in the link table. This test is similar to the test performed in block 94, above.

If there are no more link records in the established list, the subroutine returns to the recognition flowchart at block 46 of FIG. 4a.

In block 120 a test is performed to determine whether or not the link (node), preceding the current link is inactive. This is done by looking to the back pointer for the current link record and looking to its corresponding L-ACT entry. If the preceding node is active, flow proceeds to block 124 of FIG. 6b to handle the problem of ambiguity, previously discussed. If the preceding node is inactive, flow proceeds to block 142 of FIG. 6c.

Figure 6B:
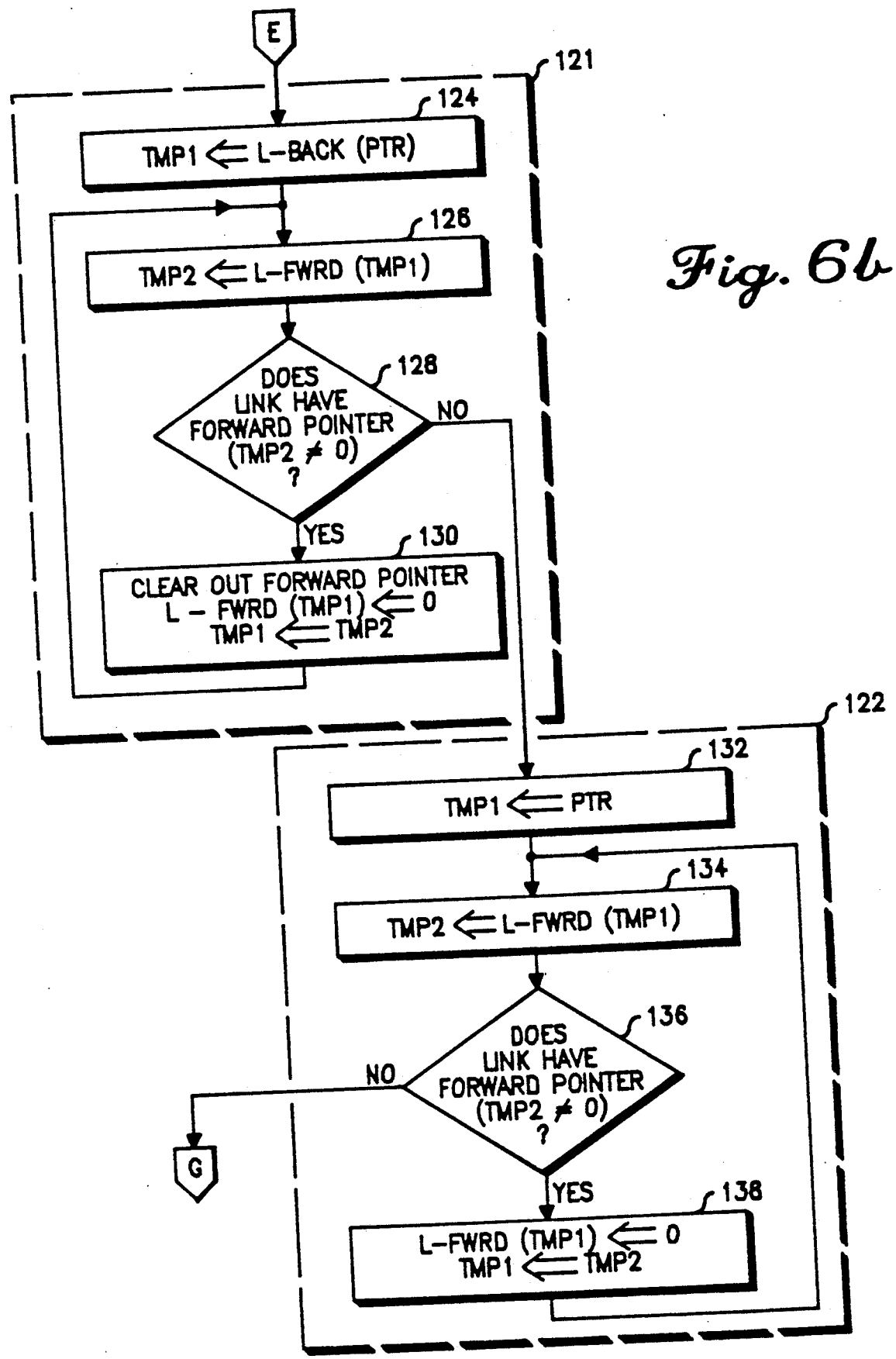

Referring now to FIG. 6b, the steps therein handle the ambiguity, when the preceding node indicates that there may be two or more link records emanating from that node that are still under consideration for a match. This occurs when a node preceding an active node is also active. The three temporary pointers (TMP1, TMP2 and PTR) are used in FIG. 6b for manipulation of link record data. The steps in block 121 remove the forward pointer chain from the previous link. These steps include blocks 124, 126, 128 and 130. FIG. 6b is entered with PTR pointing to the node, or link record, currently being processed. The L-BACK entry correspond to the link record points to the node immediately preceding the node currently being processed, as mentioned above in discussion with FIG. 7. The L-FWRD entry associated with the link record indicates the only potential descendant link record.

In block 124, a pointer to the node immediately preceding the current active node is stored in TMP1. In block 126, the descendant link record, as indicated in L-FWRD, of the preceding node is stored TMP2.

In block 128, a test is performed to determine if the node pointed to by TMP2 has an actual L-FWRD entry or if it is set to zero. If the node pointed to by TMP2 does have a forward pointer (L-FWRD not equal to 0), flow proceeds to block 130 where the forward pointer for that node is removed. In block 130, the contents of TMP2 is also moved to TMP1, which temporarily moves reference of the current node to the node pointed to by TMP2, then, starting with block 126, the above steps are repeated for the subsequent nodes until a node is found in the forward chain which does not have a forward pointer, as indicated in block 128, indicating the end of the forward chain.

The steps in block 122 remove the forward pointer chain from the current link, as indicated by PTR. In block 132 the current link record pointer, PTR, is stored in TMP1. In block 134, the L-FWRD entry for that link record is stored in TMP2. In block 136, a test is performed to determine if a forward pointer exists for this link record, as was done in block 128 above. If there is a forward pointer for this link record, flow proceeds to block 138 where the forward pointer is removed and the descendant node is stored in TMP1 for removing its forward pointer as well. Starting at block 134, the above steps are repeated until all forward pointers chained from the current node are deleted. Then, from block 136, flow proceeds to block 144 of FIG. 6c to process the next active link record.

Figure 6C:
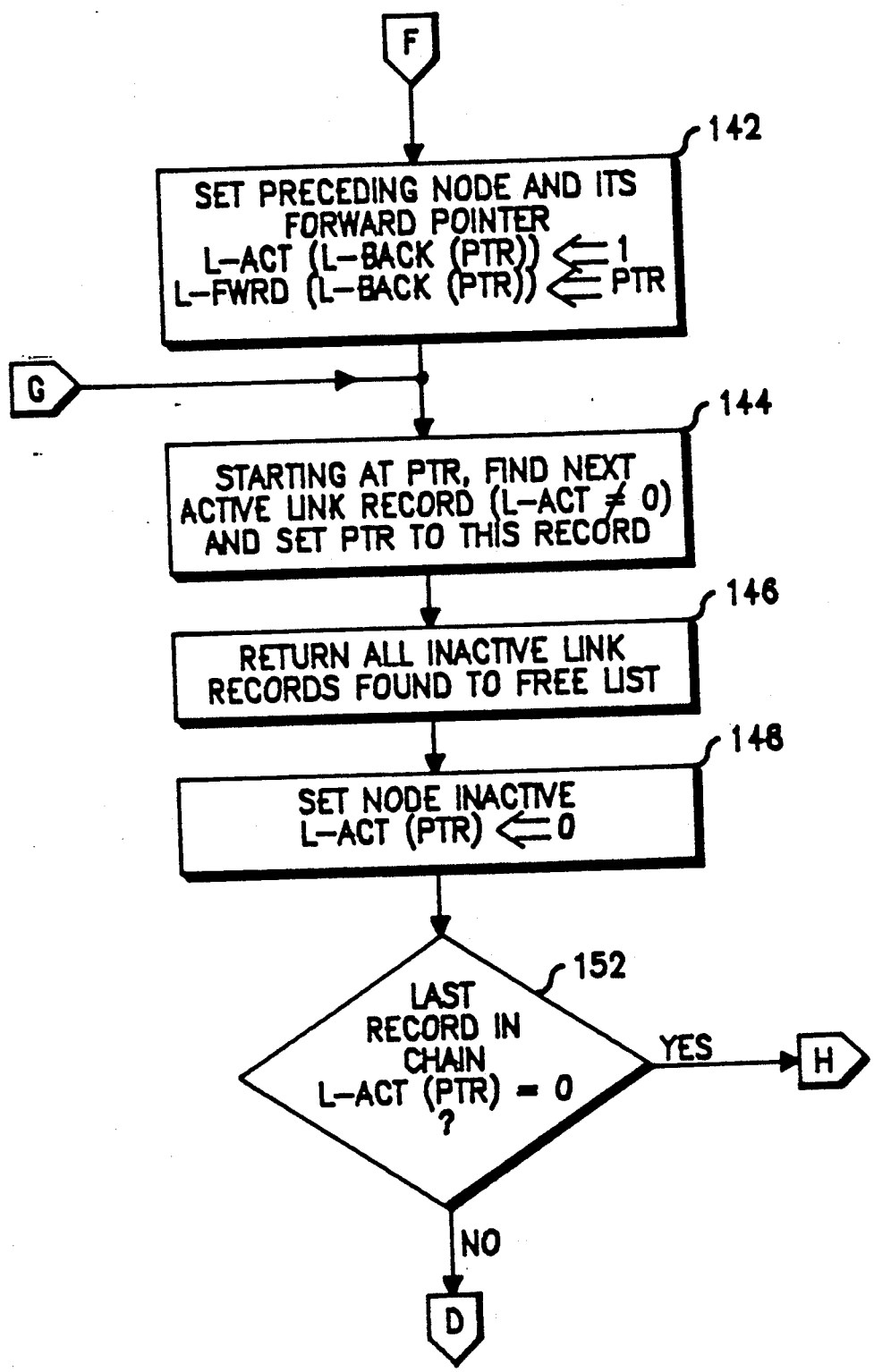

Referring back to block 120 of FIG. 6a, if the node preceding the current node is inactive, flow proceeds to block 142 of FIG. 6c, which is now discussed.

In block 142 of FIG. 6c, since the preceding node (link record) was found inactive, it is set active and its forward pointer is set to point to the current link record. In block 144, starting at the current link record, the table is searched until the next active link record is found and PTR is set to point to this record, indicating the new current link record. In block 146, all inactive records encountered during the step of block 144 are returned to the free list by modifying the appropriate entries in the L-PTR array. In block 148 the new node is set inactive to indicate that it has been accounted for, similarly done in blocks 100 and 114 of FIGS. 6a.

A test is performed in block 152 to determine whether or not this new link record is the last in the chain. If so, then all link records have been processed and flow proceeds to block 156 of FIG. 6d to output the words recognized during the traceback process. If this new link record is not the last in the chain, then flow proceeds to block 120 of FIG. 6a for additional processing.

Figure 6D:
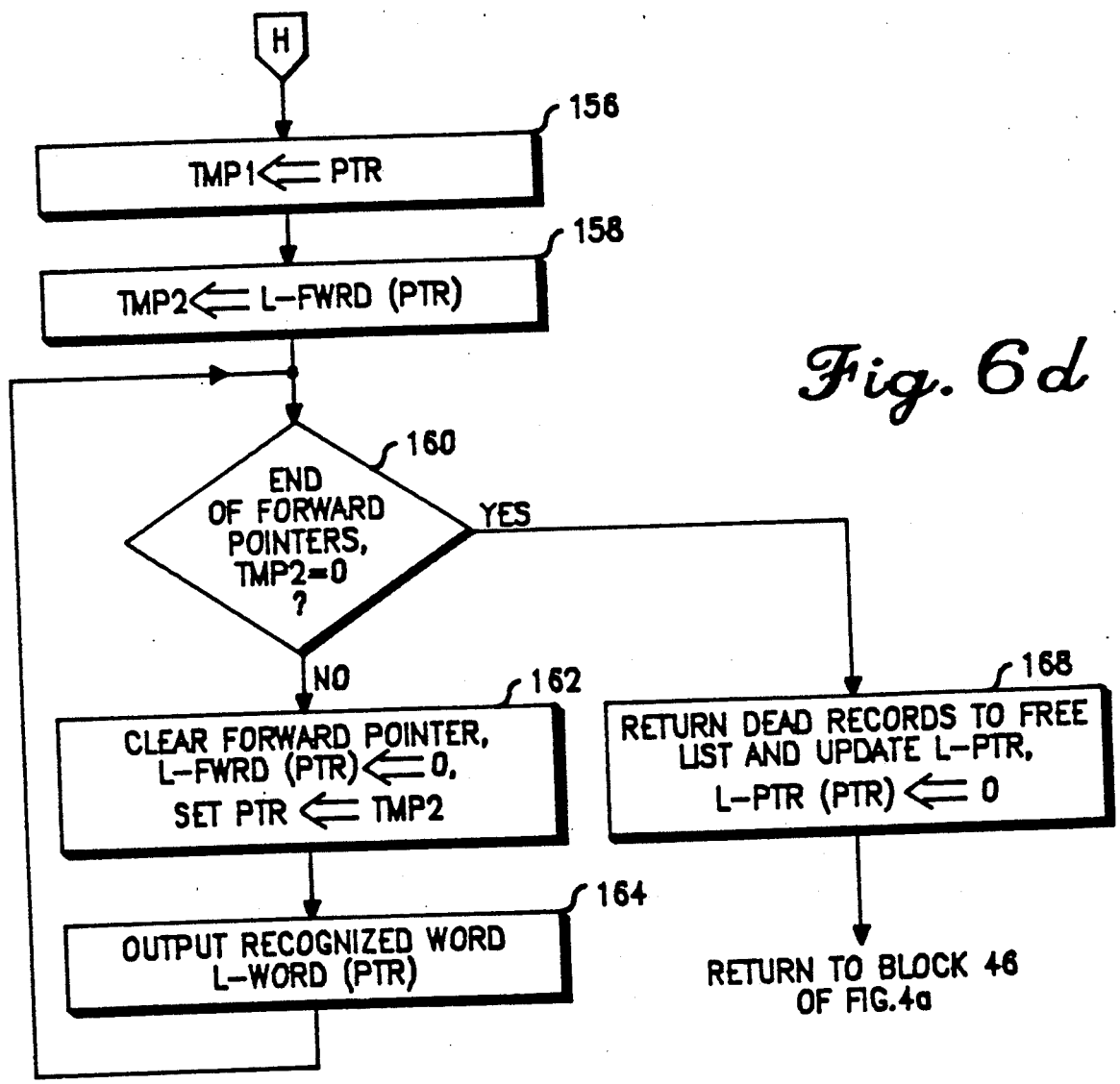

Referring now to FIG. 6d, in block 156 the index for the current link record, which is the root node in the tree, is stored in TMP1. At block 158, the node (link record) represented by the current node's forward pointer is stored in TMP2. For example, referring to diagram H of FIG. 7, TMP1 would contain 11 (node 11), and TMP2 would contain 13 (node 13).

In block 160, a test is performed to determine if there are any forward pointers descending from the node stored in TMP1. This is performed by comparing the contents of TMP2 to zero. If there are any forward pointers descending from the node stored in TMP1, flow proceeds to block 162 where the forward pointer for the current node is removed, and the current node is moved up to the next node in the forward chain, as indicated by the current node's forward pointer stored in TMP2. In block 164, the word associated with the current link record is output as a recognized word. Starting with block 158, the above steps are repeated until each link record in the forward pointer chain has its associated word output as a recognized word. During the step in block 160, a descending link record will be found which does not have a forward pointer, in which case, flow proceeds to block 168 where all dead link records, as indicated between TMP1 and PTR, are returned to the free list. Additionally, L-PTR array is updated in block 168 by setting the L-PTR entry for the new base node which is currently pointed to by PTR, with zero. The zero in this record indicates the root of the tree and the end of the established list of link records. From block 168, the traceback is complete and flow proceeds to block 46 of FIG. 4a.

The present invention therefore provides a new and improved system and method for continuous speech recognition. The invention can readily be implemented as described in the efficiently formulated above flowcharts to accommodate real time recognition in a simple and inexpensive 8-bit processor. The present invention additionally provides excellent memory management such that only a minimum number of link records are needed to be stored as input frames are processed.

While the invention has been particularly shown and described with reference to a preferred embodiment, it will be understood by those skilled in the art that various modifications and changes may be made to the present invention described above without departing from the spirit and scope thereof.

What is claimed is:

1. In a speech recognition system, wherein input frames are processed against prestored templates representing speech, and templates which are under consideration as potentially recognized templates are individually recorded in a linked network as link records, said link records generally having ancestor and descendant link records, an arrangement for recognizing speech patterns, comprising:
   means for providing temporary pointers for said link records;
   means for tracing back through said network while labeling selected ones of said link records with said temporary pointers to connect potentially recognized templates corresponding to said ones of link records;
   means for determining link records which may have two or more potentially recognized descendant link records;
   means for deleting said temporary pointers corresponding to said determined link records; and
   means for outputting data corresponding to said link records still labeled with said temporary pointers.

2. An arrangement for recognizing speech patterns, according to claim 1, including means for periodically alerting the system after a predetermined number of input frames are processed.

3. An arrangement for recognizing speech patterns, according to claim 1, including means for building the network according to a predetermined grammar model topology.

4. An arrangement for recognizing speech patterns, according to claim 1, including means for adding a link record to the network after a potential word end for at least one of said templates is recognized.

5. An arrangement for recognizing speech patterns, according to claim 1, including means for indicating the most recently appended link record in the network.

6. An arrangement for recognizing speech patterns, according to claim 1, including means for indicating a link record has no ancestor link records.

7. An arrangement for recognizing speech patterns, according to claim 1, including means for storing said link records in a table composed of free link records and established link records.

8. An arrangement for recognizing speech patterns, according to claim 7, including means for indicating the beginning of the established link records and the beginning of the free link records.

9. An arrangement for recognizing speech patterns, according to claim 7, including means for indicating the end of the established link records and the end of the free link records.

10. An arrangement for recognizing speech patterns, according to claim 1, including means for deleting temporary pointers for link records descending from said determined link records.

11. In speech recognition system, wherein input frames are processed against prestored templates representing speech, and templates which are under consideration as potentially recognized templates are individually recorded in a linked network as link records, said link records generally having ancestor and descendant link records, an arrangement for recognizing speech patterns, comprising:
    means for storing said link records as indexed data sets, each data set including a symbol representing the template, a sequence indicator representing the relative time the link record was stored, a first pointer indicating a link record in the network from which each descends, and a second temporary pointer;
    means for tracing back through the network using said indexed data sets, including said second temporary pointer, to identify at least one link record which is unambiguously recognized; and
    means for outputting said unambiguously recognized link records.

12. An arrangement for recognizing speech patterns, according to claim 11, including means for periodically alerting the system after a predetermined number of input frames are processed.

13. An arrangement for recognizing speech patterns, according to claim 11, including means for building the network according to a predetermined grammar model topology.

14. An arrangement for recognizing speech patterns, according to claim 11, including means for adding a link record to the network after a potential word end for at least one of said templates is recognized.

15. An arrangement for recognizing speech patterns, according to claim 11, including means for indicating the most recently appended link record in the network.

16. An arrangement for recognizing speech patterns, according to claim 11, including means for indicating a link record has no ancestor link records.

17. An arrangement for recognizing speech patterns, according to claim 11, including means for storing said link records in a table composed of free link records and established link records.

18. An arrangement for recognizing speech patterns, according to claim 17, including means for indicating the beginning of the established link records and the beginning of the free link records.

19. An arrangement for recognizing speech patterns, according to claim 17, including means for indicating the end of the established link records and the end of the free link records.

20. An arrangement for recognizing speech patterns, according to claim 11, including means for deleting temporary pointers for link records descending from said determined link records.

21. In speech recognition system, wherein input frames are processed against prestored templates representing speech, and templates which are under consideration as potentially recognized templates are individually recorded in a linked network as link records, said link records generally said network having ancestor and descendant link records, an arrangement for recognizing speech patterns, comprising:
    means for storing said link records as indexed data sets in a table, each data set including a symbol representing the template, a sequence indicator representing the relative time the link record was stored and a pointer indicating a link record in the network from which each descends;
    said table composed of free record space and established record space, wherein said link records are stored in said established record space;
    means for tracing back through the network using said indexed data sets to identify one or more link records whose corresponding templates are unambiguously recognized;
    means for outputting data representing said unambiguously recognized link records, and removing said link records from said established record space, whereby said removed link records becomes free record space for subsequently storing link records.

22. An arrangement for recognizing speech patterns, according to claim 21, including means for periodically alerting the system after a predetermined number of input frames are processed.

23. An arrangement for recognizing speech patterns, according to claim 21, including means for building the network according to a predetermined grammar model topology.

24. An arrangement for recognizing speech patterns, according to claim 21, including means for adding a link record to the network after a potential word end for at least one of said templates is recognized.

25. An arrangement for recognizing speech patterns, according to claim 21, including means for indicating the most recently appended link record in the network.

26. An arrangement for recognizing speech patterns, according to claim 21, including means for indicating a link record has no ancestor link records.

27. An arrangement for recognizing speech patterns, according to claim 21, including means for determining link records which have may have two or more potentially recognized descendant link records.

28. An arrangement for recognizing speech patterns, according to claim 21, including means for selecting particular link records in said established record space, whose corresponding templates have not been unambiguously recognized, and returning said particular link records to said free record space.

29. In speech recognition system, wherein input frames are processed against prestored templates representing speech, and templates which are under consideration as potentially recognized templates are individually recorded in a linked network as link records, said link records generally having ancestor and descendant link records, a method for recognizing speech patterns, comprising the steps of:
    providing temporary pointers for said link records;
    tracing back through said network while labeling selected ones of said link records with said temporary pointers to connect potentially recognized templates corresponding to said ones of link records;
    determining link records which may have two or more potentially recognized descendant link records;
    deleting said temporary pointers corresponding to said determined link records; and
    outputting data corresponding to said link records still labeled with said temporary pointers.

30. A method for recognizing speech patterns, according to claim 29, including the step of periodically alerting the system after a predetermined number of input frames are processed.

31. A method for recognizing speech patterns, according to claim 29, including the step of building the network according to a predetermined grammar model topology.

32. A method for recognizing speech patterns, according to claim 29, including the step of adding a link record to the network after a potential word end for at least one of said templates is recognized.

33. A method for recognizing speech patterns, according to claim 29, including the step of indicating the most recently appended link record in the network.

34. A method for recognizing speech patterns, according to claim 29, including the step of indicating a link record has no ancestor link records.

35. A method for recognizing speech patterns, according to claim 29, including the step of storing said link records in a table composed of free link records and established link records.

36. A method for recognizing speech patterns, according to claim 35, including the step of indicating the beginning of the established link records and the beginning of the free link records.

37. A method for recognizing speech patterns, according to claim 35, including the step of indicating the end of the established link records and the end of the free link records.

38. A method for recognizing speech patterns, according to claim 29, including the step of deleting temporary pointers for link records descending from said determined link records.

39. In speech recognition system, wherein input frames are processed against prestored templates representing speech, and templates which are under consideration as potentially recognized templates are individually recorded in a linked network as link records, said link records generally having ancestor and descendant link records, a method for recognizing speech patterns, comprising the steps of:

storing said link records as indexed data sets, each data set including a symbol representing the template, a sequence indicator representing the relative time the link record was stored, a first pointer indicating a link record in the network from which each descends, and a second temporary pointer;

tracing back through the network using said indexed data sets, including said second temporary pointer, to identify at least one link record which is unambiguously recognized; and outputting said unambiguously recognized link records.

40. A method for recognizing speech patterns, according to claim 39, including the step of periodically alerting the system after a predetermined number of input frames are processed.

41. A method for recognizing speech patterns, according to claim 39, including the step of building the network according to a predetermined grammar model topology.

42. A method for recognizing speech patterns, according to claim 39, including the step of adding a link record to the network after a potential word end for at least one of said templates is recognized.

43. A method for recognizing speech patterns, according to claim 39, including the step of indicating the most recently appended link record in the network.

44. A method for recognizing speech patterns, according to claim 39, including the step of indicating a link record has no ancestor link records.

45. A method for recognizing speech patterns, according to claim 39, including the step of storing said link records in a table composed of free link records and established link records.

46. A method for recognizing speech patterns, according to claim 45, including the step of indicating the beginning of the established link records and the beginning of the free link records.

47. A method for recognizing speech patterns, according to claim 17, including the step of indicating the end of the established link records and the end of the free link records.

48. A method for recognizing speech patterns, according to claim 39, including the step of deleting temporary pointers for link records descending from said determined link records.

49. In speech recognition system, wherein input frames are processed against prestored templates representing speech, and templates which are under consideration as potentially recognized templates are individually recorded in a linked network as link records, said link records generally said network having ancestor and descendant link records, a method for recognizing speech patterns, comprising the steps of:

storing said link records as indexed data sets in a table, each data set including a symbol representing the template, a sequence indicator representing the relative time the link record was stored and a pointer indicating a link record in the network from which each descends, said table composed of free record space and established record space, wherein said link records are stored in said established record space;

tracing back through the network using said indexed data sets to identify one or more link records whose corresponding templates are unambiguously recognized;

outputting data representing said unambiguously recognized link records, and removing said link records from said established record space, whereby said removed link records becomes free record space for subsequently storing link records.

50. A method for recognizing speech patterns, according to claim 49, including the step of periodically alerting the system after a predetermined number of input frames are processed.

51. A method for recognizing speech patterns, according to claim 49, including the step of building the network according to a predetermined grammar model topology.

52. A method for recognizing speech patterns, according to claim 49, including the step of adding a link record to the network after a potential word end for at least one of said templates is recognized.

53. A method for recognizing speech patterns, according to claim 49, including the step of indicating the most recently appended link record in the network.

54. A method for recognizing speech patterns, according to claim 49, including the step of indicating a link record has no ancestor link records.

55. A method for recognizing speech patterns, according to claim 49, including the step of determining link records which may have two or more potentially recognized descendant link records.

56. A method for recognizing speech patterns, according to claim 49, including the step of selecting particular link records in said established record space, whose corresponding templates have not been output, and returning said particular link records to said free record space.

* * * * *